United States Patent
Tanaka et al.

(10) Patent No.: US 10,344,699 B2
(45) Date of Patent: Jul. 9, 2019

(54) CONTROL DEVICE FOR INJECTOR (71) Applicant: Mitsubishi Electric Corporation, Tokyo (JP)

(72) Inventors: Toru Tanaka, Tokyo (JP); Tomokazu Makino, Tokyo (JP); Hiroyuki Fukuyama, Hyogo (JP); Takeji Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 5 days.

(21) Appl. No.: 15/728,819

(22) Filed: Oct. 10, 2017

(65) Prior Publication Data
US 2018/0306138 A1 Oct. 25, 2018

(30) Foreign Application Priority Data
Apr. 19, 2017 (JP) .................. 2017-082719

(51) Int. Cl.
*F02D 41/24* (2006.01)
*F02D 41/20* (2006.01)
*F02D 41/40* (2006.01)

(52) U.S. Cl.
CPC ......... *F02D 41/2467* (2013.01); *F02D 41/20* (2013.01); *F02D 41/40* (2013.01); *F02D 41/402* (2013.01); *F02D 2200/0602* (2013.01); *F02D 2200/0618* (2013.01)

(58) Field of Classification Search
CPC ...... F02D 41/20; F02D 41/40; F02D 41/2467; F02D 41/402; F02D 2200/0602; F02D 2200/0618
See application file for complete search history.

(56) References Cited

U.S. PATENT DOCUMENTS

| 6,279,559 B1* | 8/2001 | Mauro | ................ F02D 41/2454 123/480 |
| 2002/0162542 A1* | 11/2002 | Dutart | ..................... F02D 41/20 123/490 |
| 2018/0230931 A1* | 8/2018 | Imai | ....................... F02D 41/40 |

FOREIGN PATENT DOCUMENTS

JP 2009-250092 A 10/2009

OTHER PUBLICATIONS

Ryo Kusakabe, et al., "Injection Quantity Range Enhancement by Using Current Waveform Control Technique for DI Gasoline Injector", Society of Automotive Engineers of Japan, Inc., J. Engines, Jul. 2014, pp. 1-8, vol. 7, Issue 2.

* cited by examiner

*Primary Examiner* — Sizo B Vilakazi
(74) *Attorney, Agent, or Firm* — Sughrue Mion, PLLC; Richard C. Turner (57) ABSTRACT

A microcomputer is configured to: calculate, the drive period of a previous injection, an injection interval, and an uncorrected target drive period for a current injection; obtain a correction period by increasing an internal variable from zero in proportion to the drive period of the previous injection during this drive period, attenuating the internal variable at a first-order delay during the injection interval, dividing the internal variable by a coefficient of the proportion at a start time point of the present current supply, and setting a result of the division as the correction period; and set a period obtained by subtracting the correction period from the uncorrected target drive period as a current drive period, to thereby supply a signal indicating the current drive period to the injector via a driver.

6 Claims, 11 Drawing Sheets

CONTROL DEVICE FOR INJECTOR

BACKGROUND OF THE INVENTION

1. Field of the Invention

The present invention relates to a control device for an injector, which is provided in an internal combustion engine, and is configured to directly inject a fuel from a fuel injection valve into a cylinder, and more particularly, to a control device for an injector, which is suitable for carrying out fuel injection at a plurality of times in a split manner.

2. Description of the Related Art

Hitherto, there has been known a technology of splitting one injection of fuel into a plurality of injections in order to suppress emission of particulate matters in an in-cylinder injection type internal combustion engine. In such split injection, there has been also known the fact that an injection interval between a previous injection (first injection) and a next injection (second injection) affects the injection amount of the second injection. Thus, there has been proposed a technology of correcting a second drive period in accordance with the injection interval (e.g., refer to Japanese Patent Application Laid-open No. 2009-250092).

Moreover, the injector is modeled so as to enable analysis of a dynamic behavior of the injector, which is a device for injecting the fuel, and there has been introduced a model that is built by analyzing various dynamics acting on the injector and usable for simulation (e.g., Society of Automotive Engineers of Japan, Proceedings of Technical Session Presentation, No. 42-13, pp. 27-32). With this model, it is expected that a correction value required in Japanese Patent Application Laid-open No. 2009-250092 is logically obtained.

Figure 1:
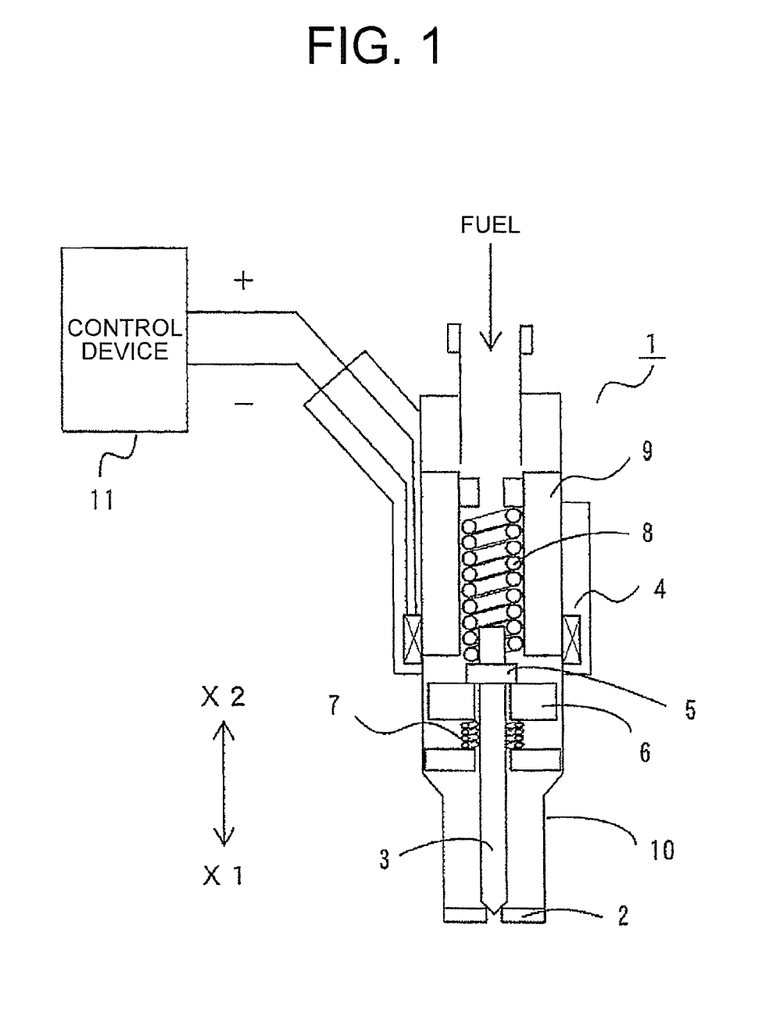
FIG. 1 is a schematic cross-sectional view for illustrating a general structure of an injector.

FIG. 1 is a cross-sectional view for schematically illustrating the structure of a known related-art injector 1. The injector 1 includes a valve seat 2, a valve needle 3 for separating from/abutting against the valve seat 2 to open/close a fuel passage, and a solenoid 4 for driving the valve needle 3 to open/close. Moreover, the injector 1 includes an armature 6, which is arranged on a valve closing direction X1 side with respect to a flange 5 of the valve needle 3, and is attracted toward a valve opening direction X2 by a magnetic force generated by current supply to the solenoid 4, a zero-position spring 7 for energizing the armature 6 toward the valve opening direction X2, and a main spring 8 for energizing the valve needle 3 toward the valve closing direction X1, which has a stronger energizing force than that of the zero-position spring 7. Further, the injector 1 includes a magnetic core 9 and a case 10. The case 10 is formed into a tubular shape, and is configured to internally store the components of the injector 1. The solenoid 4 is a coil having a cylindrical shape, which is wound on a bobbin, and is controlled to be supplied with a current by a control device 11.

The valve needle 3 is a member having a rod shape, which has a pointed tip in the valve closing direction X1. The flange 5 is provided on an end of the valve needle 3 in the valve opening direction X2. The main spring 8 is arranged on the valve opening direction side X2 of the valve needle 3, and is configured to energize the valve needle 3 toward the valve closing direction X1 with respect to the case 10. When the current supply to the solenoid 4 is stopped, the valve needle 3 is moved toward the valve closing direction X1 by the energizing force of the main spring 8 and the fuel pressure, and when the tip of the valve needle 3 abuts against an injection opening formed in the valve seat 2, the injection opening is blocked to result in the closed state.

The armature 6 is a magnetic body formed into a cylindrical shape, and is arranged on the valve closing direction X1 side with respect to the flange 5, and on an outer peripheral side of a shaft body of the valve needle 3. The armature 6 and the valve needle 3 can move relatively to each other. The zero-position spring 7 is arranged on the valve closing direction X1 side with respect to the armature 6, and is configured to energize the armature 6 toward the valve opening direction X2 with respect to the case 10. An elastic force of the zero-position spring 7 is set to be less than an elastic force of the main spring 8. The armature 6 is arranged on the valve closing direction X1 side with respect to the magnetic core 9. When the current is supplied to the solenoid 4 by the control device 11, the armature 6 is attracted toward the valve opening direction X2 side by the magnetic force generated in the magnetic core 9 and the like. As a result, under a state in which the armature 6 is abutting against the flange 5 of the valve needle 3, the armature 6 and the valve needle 3 integrally move toward the valve opening direction X2. When the tip of the valve needle 3 separates from the valve seat 2, the injection opening opens to result in the open state.

When the current supply to the solenoid 4 is stopped, the attraction force toward the valve opening direction X2 side on the armature 6 by the magnetic force of the magnetic core 9 disappears, and the valve needle 3 is moved toward the valve closing direction X1 by the energizing force toward the valve closing direction X1 of the main spring 8. On this occasion, the flange 5 of the valve needle 3 pushes the armature 6 toward the valve closing direction X1, and the valve needle 3 and the armature 6 integrally move toward the valve closing direction X1. When the tip of the valve needle 3 collides with the valve seat 2, the movement of the valve needle 3 stops, but the armature 6 separates from the flange 5, and continues to move toward the valve closing direction X1. Subsequently, the armature 6 decelerates due to the energizing force toward the valve opening direction X2 by the zero-position spring 7, moves toward the valve opening direction X2, and again abuts against the flange 5 to stop.

Figure 2:
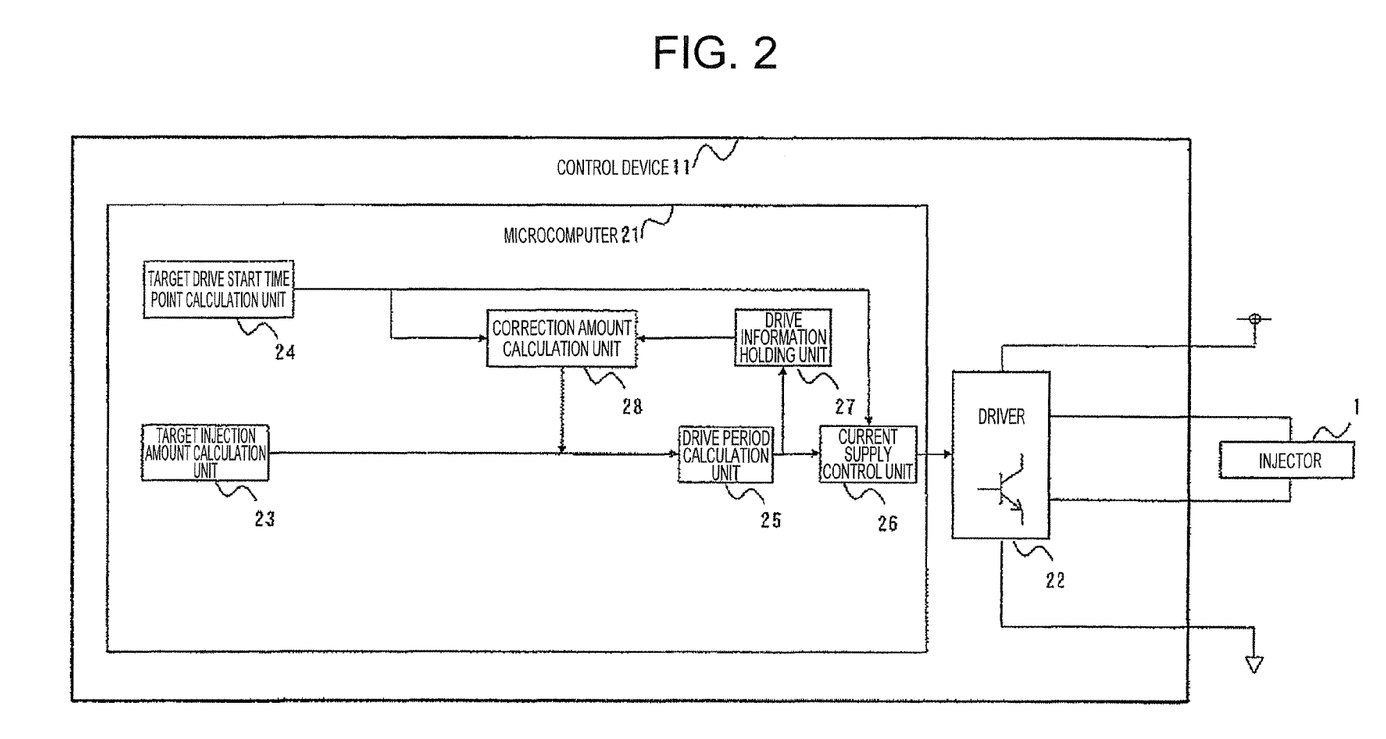
FIG. 2 is a block diagram for illustrating a control device for an injector according to a first embodiment of the present invention, and the related art.

Referring to FIG. 2, a description is now given of the control device 11. In the following, a description is given of an operation for one injector 1, but the same operation is also carried out for a case in which a plurality of injectors 1 are provided. Moreover, in the following, a description is given of one injection, but the following operation is repeated for each injection in a case of the split injection in which a plurality of injections are carried out in one combustion cycle. Calculation may be carried out once for all the injections, or calculation may be carried out for a next injection after each injection is finished.

As illustrated in a block diagram of FIG. 2, the control device 11 includes a microcomputer 21 and a driver 22, and the driver 22 is connected to the microcomputer 21, a power supply, the injector 1, and a GND (ground potential). The injector 1 can be driven as instructed by the microcomputer 21 by supplying the voltage of the power supply to the injector 1 based on a signal from the microcomputer 21.

The microcomputer 21 includes, as functional blocks, a target injection amount calculation unit 23, a target drive start time point calculation unit 24, a drive period calculation unit 25, a current supply control unit 26, a drive information holding unit 27, and a correction amount calculation unit 28.

The target injection amount calculation unit 23 is configured to calculate a target injection amount of the subject injector (hereinafter simply referred to as "injector") 1 from a state of the internal combustion engine, a signal of an accelerator opening degree (not shown), and the like.

The target drive start time point calculation unit 24 is configured to calculate the target drive start time point for the injector 1 from the state of the internal combustion engine, a signal of the accelerator opening degree (not shown), and the like.

The drive period calculation unit 25 is configured to calculate an uncorrected drive period in accordance with a characteristic of the injector 1 set in advance. Then, a corrected drive period is calculated by multiplying the drive period by a correction coefficient received from the correction amount calculation unit 28 described later.

The current supply control unit 26 is configured to output a signal for turning on the driver 22 for only the corrected drive period when the target drive start time point is reached. The driver 22 is configured to drive switching devices connected to the injector 1 based on this signal. The fuel can be injected from the injector 1 at the injection amount and at the injection timing in accordance with the operation state of the internal combustion engine and the like in this way.

The drive information holding unit 27 is configured to calculate a drive end time point, which is obtained by adding the corrected drive period to the target drive start time point, and temporarily hold the drive end time point until the next drive period of the injector 1 is calculated.

When the injection for the current time is finished, and the target drive start time point is calculated by the target drive start time point calculation unit 24 in order to drive the injector 1 for the next time, the correction amount calculation unit 28 retrieves the drive end time point of the previous injection from the drive information holding unit 27, and calculates a difference from the current target drive start time point, namely, the injection interval. Then, the correction amount calculation unit 28 calculates a correction coefficient in accordance with this injection interval and the characteristics of the injector 1 set in advance.

The drive period calculation unit 25 is configured to convert the target injection amount to the drive period, and multiply the drive period by the correction coefficient received from the correction amount calculation unit 28 for the correction as described above. The driver 22 is driven by the current supply control unit 26 for the corrected drive period, and the target drive start time point is temporarily held by the drive information holding unit 27 in preparation for the next injection.

Figure 3:
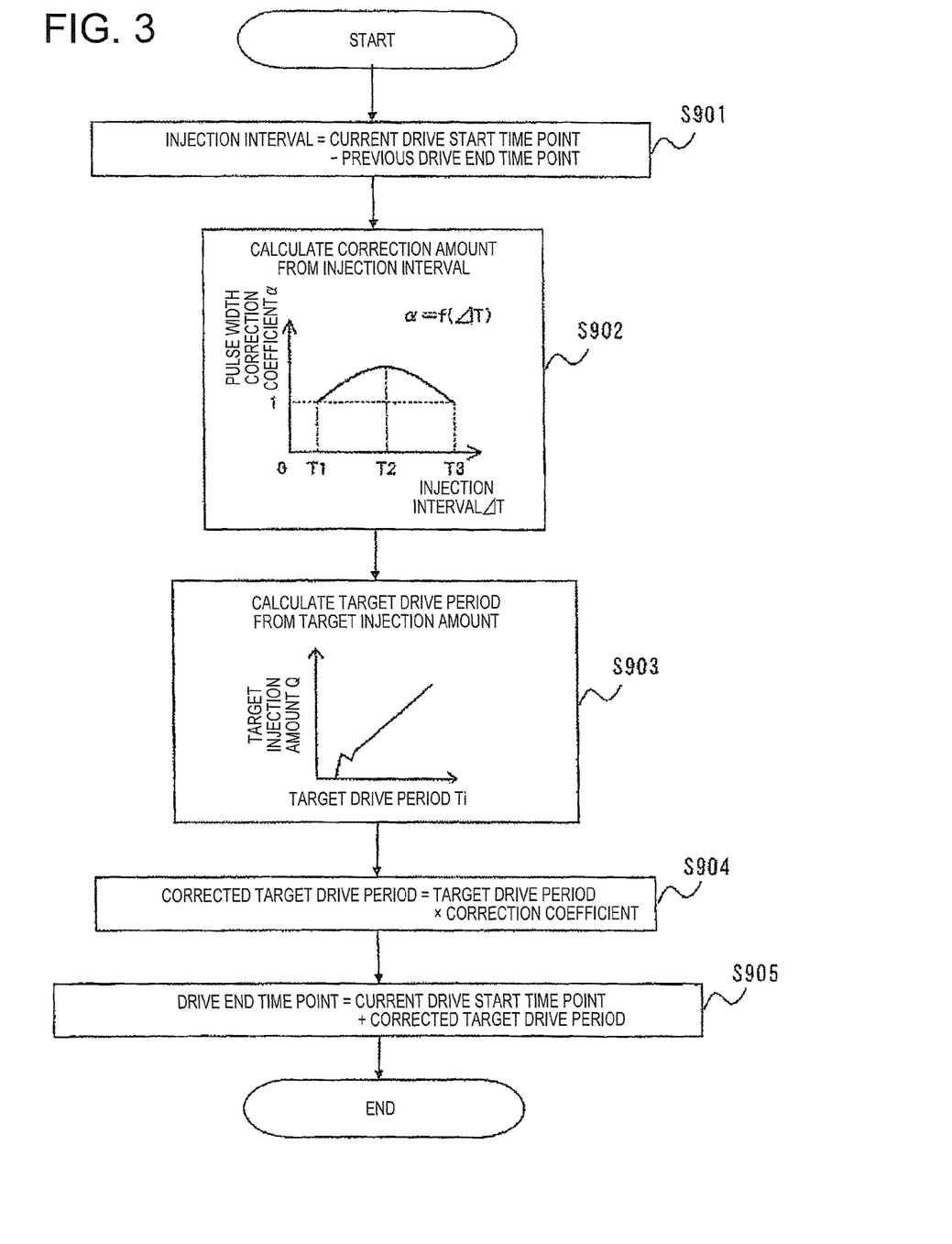
FIG. 3 is a flowchart for illustrating a calculation sequence of a drive period of the injector of the related art.

FIG. 3 is an operation flowchart of the correction amount calculation unit 28, the drive period calculation unit 25, and the drive information holding unit 27 of the related art illustrated in FIG. 2.

First, a description is given of the correction amount calculation unit 28.

In Step S901, the injection interval $\Delta T$ is calculated by subtracting the previous drive end time point stored in the drive information holding unit 27 from the target drive start time point calculated by the target drive start time point calculation unit 24.

In Step S902, a pulse width correction coefficient $\alpha$ is calculated in accordance with a shown characteristic of the injector 1 set in advance based on the injection time interval $\Delta T$.

Next, a description is given of the drive period calculation unit 25.

In Step S903, a target drive period is calculated from the target injection amount calculated by the target injection amount calculation unit 23 based on a shown characteristic of the injector set in advance.

In Step S904, a corrected target drive period is calculated by multiplying the calculated target drive period by the pulse width correction coefficient $\alpha$.

Next, a description is given of the drive information holding unit 27.

In Step S905, the drive end time point is calculated by adding the corrected target drive period in Step S904 to the target drive start time point in Step S901, and is then held.

In this way, the injection amount of the injector 1 can be corrected through the injection interval, which is a period from the previous drive end to the current drive start.

However, influence of the drive period of the first injection is not considered in Japanese Patent Application Laid-open No. 2009-250092. A description is now given of this point.

Figure 4A:
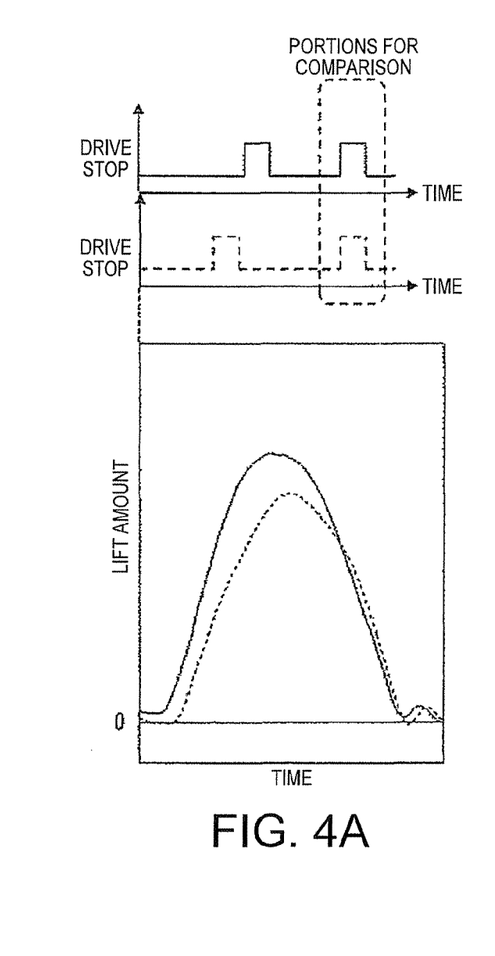
FIG. 4A is a chart for showing an example in which waveforms in the solid line and the dotted line different only in an injection interval are overlapped.
Figure 4B:
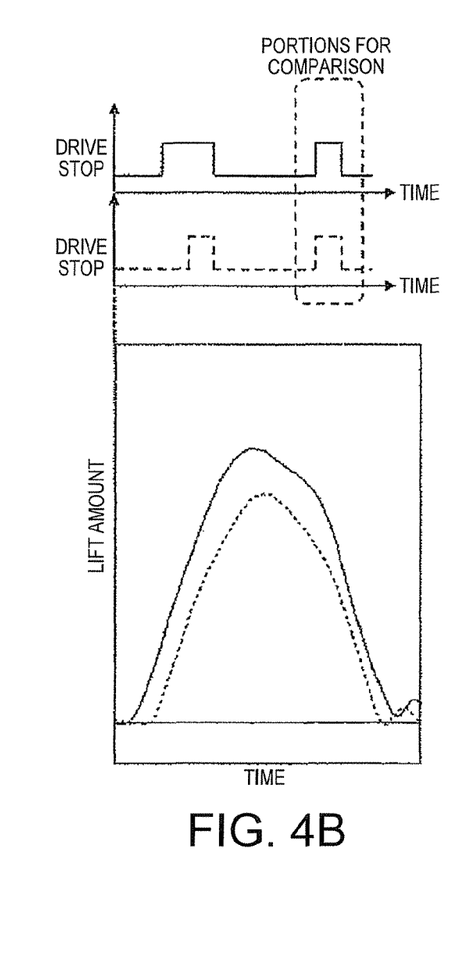
FIG. 4B is a chart for showing an example in which waveforms in the solid line and the dotted line different only in a drive period of a first injection are overlapped.
Figure 4C:
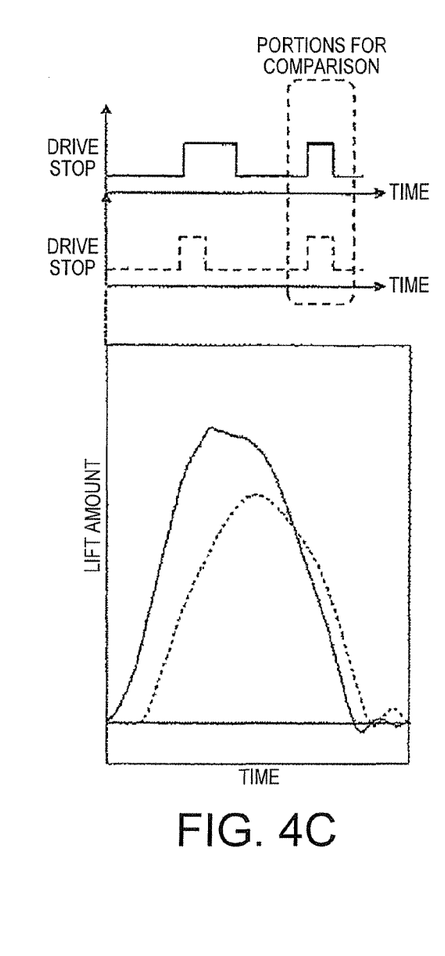
FIG. 4C is a chart for showing a measurement comparative example under the condition in which both the injection interval of FIG. 4A and the drive period of FIG. 4B are changed.

FIG. 4A to FIG. 4C are charts for showing behaviors of the valve needle 3 of the injector 1 separating from the valve seat 2. The vertical axes of all of the charts represent a distance between the valve needle 3 and the valve seat 2 on the assumption that the lift amount is zero when the valve needle 3 seats on the valve seat 2, and represent a lift amount for each second injection when two consecutive injections are carried out.

Waveforms indicated by the dotted lines of FIG. 4A to FIG. 4C are the same waveform, and represent a reference waveform for comparison. Waveforms indicated by the solid lines are waveforms measured under a condition different in the first drive period and the injection interval from the condition of the measurement represented as the dotted lines. Parallel translation in time is carried out so that drive signals for the second injection overlap to cause the two measured waveforms to overlap each other. The drive periods of the second injection are the same between the solid waveform and the dotted waveform.

FIG. 4A is a chart for showing an example in which waveforms different only in the injection interval are overlapped using the solid line and the dotted line. The difference in the injection interval causes a difference in behavior of the valve needle 3, resulting in a difference in the injection amount. This injection amount can be corrected through the technology disclosed in Japanese Patent Application Laid-open No. 2009-250092.

FIG. 4B is a chart for showing an example in which waveforms different only in the drive period of the first injection are overlapped using the solid line and the dotted line. The difference in the drive period causes a difference in the behavior of the valve needle 3, resulting in a difference in the injection amount, but the injection intervals are the same. Thus, this injection amount cannot be corrected by the technology disclosed in Japanese Patent Application Laid-open No. 2009-250092. In other words, the injection amount cannot sufficiently be corrected only by the injection interval, and it is appreciated that the drive period of the first injection, namely, previous injection also needs to be considered.

FIG. 4C is a chart for showing a measurement comparative example under the condition that both the injection interval of FIG. 4A and the drive interval of FIG. 4B are changed for the condition represented as the dotted line. The waveform is not such a waveform as obtained by simply adding the changes of FIG. 4A and FIG. 4B, and it is appreciated that the previous drive period and the injection interval exert complex influence on the behavior of the valve needle 3. In Society of Automotive Engineers of Japan, Proceedings of Technical Session Presentation No. 42-13, pp. 27-32, there is disclosed a trial to physically analyze and model the behavior of the valve needle 3 from this motivation. When a drive signal of the injector 1 is input to the model, the model calculates the behavior of the valve needle 3, and provides the injection amount.

However, in Society of Automotive Engineers of Japan, Proceedings of Technical Session Presentation No. 42-13, pp. 27-32, it is not considered to use an actual control device for the calculation. In other words, the model disclosed in Society of Automotive Engineers of Japan, Proceedings of Technical Session Presentation No. 42-13, pp. 27-32 is configured to calculate the injection amount from the drive signal, but, in the control for the injector 1, the target injection amount is first given, and the drive signal for achieving the injection amount, namely, the drive period needs to be obtained. Thus, the calculation opposite to that of the model needs to be carried out.

However, it is difficult to obtain, in advance, an exact solution for inversely solving Expression (19) shown in p. 31 of Society of Automotive Engineers of Japan, Proceedings of Technical Session Presentation No. 42-13, pp. 27-32. Therefore, an approximate solution is thus obtained through numerical calculation, which requires iterative calculation until convergence and a calculation load is thus very high.

Meanwhile, the calculation performance of the control device is not so high as to carry out such calculation. Thus, such calculation cannot be achieved, or a high-performance microcomputer is required, which leads to an increase in cost.

Moreover, the dependency of the correction on the fuel pressure is not considered in Japanese Patent Application Laid-open No. 2009-250092.

Moreover, as disclosed in Society of Automotive Engineers of Japan, Proceedings of Technical Session Presentation No. 42-13, pp. 27-32, the force acting on the valve needle 3 is affected by a pressure difference between the fuel pressure and a pressure of an injection destination. Meanwhile, in Society of Automotive Engineers of Japan, Proceedings of Technical Session Presentation No. 42-13, pp. 27-32, the calculation is carried out by approximation through sequential computation, and thus there is a problem in that a calculation load is high, and the inverse calculation is difficult.

SUMMARY OF THE INVENTION

The present invention has been made in view of the above-mentioned problems, and therefore has an object to provide a control device for an injector, which is capable of optimally calculating second and subsequent drive periods while considering not only an injection interval, but also a drive period of a first injection.

In order to achieve the above-mentioned object, according to one embodiment of the present invention, there is provided a control device for an injector, including: a driver configured to drive an injector provided in a fuel passage of an internal combustion engine; and a microcomputer configured to calculate a drive signal to be supplied to the driver, in which the microcomputer is configured to: calculate, when a period from a start of current supply to the injector to a stop of the current supply is set as a drive period, the drive period of a previous injection, an injection interval, which is a period from a stop of previous current supply to a start of present current supply, and an uncorrected target drive period for a current injection; obtain a correction period by increasing a value from zero in proportion to the drive period of the previous injection during the drive period of the previous injection, attenuating the value at a first-order delay during the injection interval, dividing the value by a coefficient of the proportion at a start time point of the present current supply, and setting a result of the division as the correction period; and set a period obtained by subtracting the correction period from the uncorrected target drive period as a current drive period.

According to the present invention, the microcomputer is configured to: calculate the drive period of the previous injection, the injection interval, which is the period from the stop of the previous current supply to the start of the present current supply, and the uncorrected target drive period for the current injection; obtain the correction period by increasing the value from zero in proportion to the drive period of the previous injection during the drive period of the previous injection, attenuating the value at the first-order delay during the injection interval, dividing the value by the coefficient of the proportion at the start time point of the present current supply, and setting the result of the division as the correction period; and set the period obtained by subtracting the correction period from the uncorrected target drive period as the current drive period. Thus, the influence of the preceding injection can be corrected, and the low load enables the control device to carry out the calculation.

BRIEF DESCRIPTION OF THE DRAWINGS

FIG. 4A, FIG. 4B, and FIG. 4C are waveform charts for showing operations of a valve needle of the injector, in which

FIG. 8A, FIG. 8B, and FIG. 8C are timing charts for showing drive operation of the injector of the first embodiment of the present invention, in which

FIG. 9A, FIG. 9B, and FIG. 9C are timing charts for showing another drive operation of the injector of the first embodiment of the present invention, in which

8B is a timing chart for showing the lift amount, and FIG. 8C is a timing chart for showing the internal variable.

FIG. 11A and FIG. 11B are timing charts for showing a general drive operation of the injector, in which

DESCRIPTION OF THE EMBODIMENTS

First Embodiment

Now, various embodiments of the present invention are described in detail with reference to the accompanying drawings. The same injector as that of the related art illustrated in FIG. 1 is used.

Figure 5:
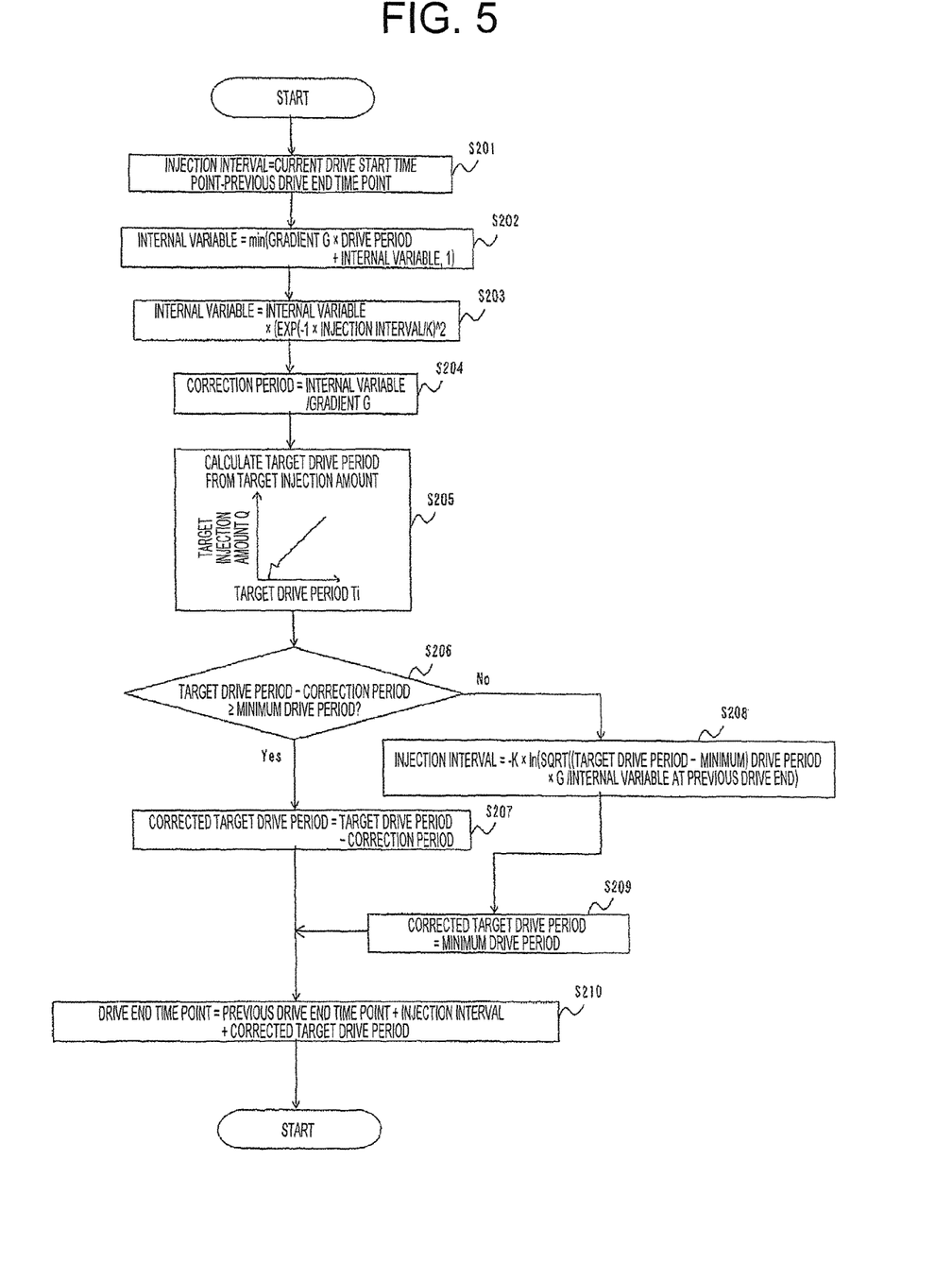
FIG. 5 is a flowchart for illustrating a calculation sequence of the drive period of the injector of the first embodiment of the present invention.

A control device for an injector according to a first embodiment of the present invention has the same configuration and arrangement as those illustrated in the block diagram of FIG. 2, but the details of operation are different from those of the related art as illustrated in a flowchart of FIG. 5.

Specifically, a target injection amount calculation unit 23, a target drive start time point calculation unit 24, and a current supply control unit 26 operate in the same manner as those of the related art illustrated in a flowchart of FIG. 3, but in the first embodiment, the correction amount calculation unit 28, the drive period calculation unit 25, and the drive information holding unit 27 operate differently as described below.

A brief description is now given of the first embodiment. The correction amount calculation unit 28 is configured to calculate a difference between a drive end time point of a previous injection held in the drive information holding unit 27 and a current target drive start time point calculated by the target drive start time point calculation unit 24, namely, an injection interval. An internal variable of the injector 1, namely, an internal state is attenuated at the square of a first-order delay during this injection interval, thereby obtaining a remainder of the internal variable at the current drive start time point. As disclosed in Society of Automotive Engineers of Japan, Proceedings of Technical Session Presentation No. 42-13, pp. 27-32, a delay caused by an eddy current is approximated by an attenuation of the first-order delay during the injection interval. When a magnetic flux density caused by the eddy current forms an attraction force acting on the valve needle 3, the delay caused by the eddy current is proportional to the square of the first-order delay, and the internal variable is attenuated at the square of the first-order delay. The result is an offset of an elastic energy of the valve needle 3 and the like in the injection of the first embodiment, and hence a drive period corresponding to the offset is obtained through a proportional coefficient (hereinafter referred to as "gradient G"). This is set as the correction amount.

The "internal variable" is merely a simplified indicator for calculating the correction amount in a microcomputer, and is used for the sake of convenience.

The drive period calculation unit 25 is configured to subtract the correction amount from the target drive period from the target injection amount calculation unit 23. As a result, the same behavior of the valve needle 3 as that without the offset is obtained. The driver 22 is driven by the current supply control unit 26 in the corrected drive period, and the drive information holding unit 27 is configured to temporarily hold the target drive start time point and the drive period in preparation for the next injection.

With reference to a flowchart of FIG. 5, a description is given of operations of the correction mount calculation unit 28, the drive period calculation unit 25, and the drive information holding unit 27.

With reference to Steps S201 to S204 of FIG. 5, a description is given of the correction amount calculation unit 28.

In Step S201, as in Step S901 of FIG. 3, the injection interval is calculated by subtracting the previous drive end time point stored in the drive information holding unit 27 from the target drive start time point calculated by the target drive start time point calculation unit 24.

In Step S202, as represented by Expression (1), calculation of setting, as the internal variable, a smaller one of a value obtained by adding the internal variable maintained in the microcomputer 21 to a product of the gradient G, which is a constant set in advance, and the previous drive period stored in the drive information holding unit 27 and "1" is carried out.

$$\text{Internal Variable} = \min(\text{Gradient } G \times \text{Drive Period} + \text{Internal Variable}, 1) \quad (1)$$

This internal variable corresponds to the elastic energy of the valve needle 3 and the like as described above. In the first embodiment, the value of the internal variable is a value ranging from 0 to 1, but may be a value other than 1.

On this occasion, the gradient G is defined as a reciprocal of a period from the start of the current supply to a full lift of the valve needle 3. The timing at which the valve needle 3 reaches the full lift is easily detected by an acceleration sensor (not shown) mounted to the injector 1, is measured while the fuel pressure is being changed, and is set in accordance with the result.

Figure 6:
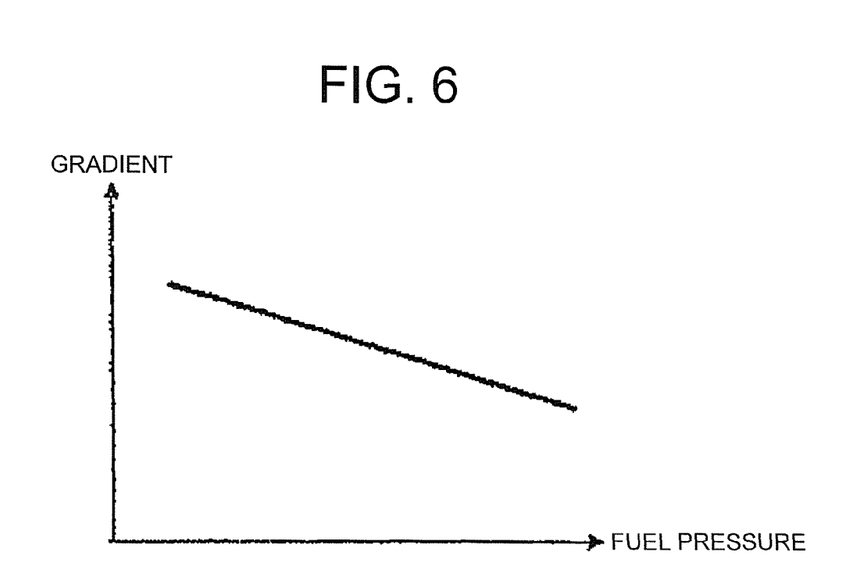
FIG. 6 is a characteristic chart for showing a relationship between a fuel pressure and a proportional coefficient, which is used in the first embodiment of the present invention.

In general, as the fuel pressure changes, a delay period from the start of the current supply to the start of the movement of the valve needle 3 and the like change. Thus, for example, as shown in a characteristic chart of FIG. 6, the gradient G is preferably a value that depends on the fuel pressure.

In Step S203, the internal variable is updated through a first-order delay time constant K, which is a constant set in advance, and the injection interval calculated in Step S201 in accordance with Expression (2).

$$\text{Internal Variable} = \text{Internal Variable} \times (\text{EXP}(-1 \times \text{Injection Interval}/K))^{\wedge}2 \quad (2)$$

EXP(t) is an exponential function having e as the base. Moreover, the square of the above-mentioned expression may be included in EXP, thereby transforming Expression (2) as follows:

$$\text{Internal Variable} = \text{Internal Variable} \times \text{EXP}(-1 \times \text{Injection Interval}/K') \quad (2')$$

where K'=K/2.

In other words, Expressions (2) and (2') are equivalent to each other depending on the setting of the time constant K. The description given below is based on Expression (2).

Figure 7:
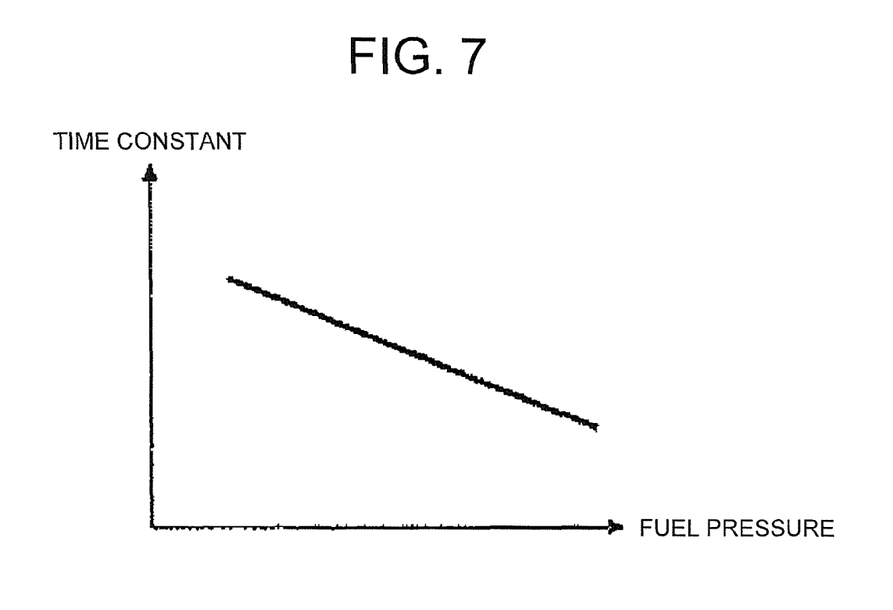
FIG. 7 is a characteristic chart for showing a relationship between the fuel pressure and a time constant, which is used in the first embodiment of the present invention.

On this occasion, the first-order delay time constant K is measured while the fuel pressure is being changed after the gradient G is determined, and is set in accordance with the result. In general, as the fuel pressure changes, a period from the end of the current supply to the seating of the valve needle 3 on the valve seat 2 and the like change. Thus, for example, as shown in a characteristic chart of FIG. 7, the first-order delay time constant K is preferably a value that depends on the fuel pressure.

In Step S204, a correction period is obtained by dividing the internal variable by the gradient G in accordance with Expression (3).

$$\text{Correction Period} = \text{Internal Variable}/\text{Gradient } G \tag{3}$$

In a case where an elapsed period from the previous drive end time point is sufficiently long, for example, in a case of a first injection of the split injection, the correction period is a very small value. In such a case, the correction period of Expression (3) may be set to 0.

With reference to Steps S205 to S209, a description is now given of the drive period calculation unit 25.

In Step S205, a target drive period is calculated from the target injection amount calculated by the target injection amount calculation unit 23 in accordance with a shown characteristic of the injector 1 set in advance.

In Step S206, whether or not a result of subtraction of the correction period of Expression (3) from the calculated target drive period is equal to or more than the minimum drive period is checked. When the result is equal to or more than the minimum drive period, the processing proceeds to Step S207. When the result is less than the minimum drive period, the processing proceeds to Step S208.

On this occasion, the minimum drive period is a threshold for preventing the corrected drive period from becoming less than an ineffective drive period and resulting in a failure to achieve a split injection. Thus, the minimum drive period is set to maintain the injection in accordance with an actual evaluation result as a value more than the minimum drive period in which the injector 1 can inject the fuel. The minimum drive period may be the so-called ineffective drive period for a case without a previous injection. When the injection is carried out subsequently to the previous injection, the minimum drive period may be set to be less than the ineffective drive period, which is described referring to FIG. 4A to FIG. 4C. Therefore, the minimum drive period may be set to 0.

Alternatively, when the precision of the calculation model of the first embodiment is high, the minimum drive period is unlikely to become less than the ineffective drive period, and thus the operations of from Step S205 to Step S206 may be skipped to directly proceed to Step S207. The second injection can always be achieved in this way.

In Step S207, the correction period is subtracted from the target drive period, and a result of the subtraction is set as the corrected target drive period.

Then, in Step S208, the injection interval is corrected so that the minimum drive period is the corrected target drive period. The injection interval is calculated in accordance with Expression (4) by using Expression (2) and Expression (3).

$$\text{Injection Interval} = -K \times \ln(\text{SQRT}((\text{Target Drive Period} - \text{Minimum Drive Period}) \times G/\text{Internal Variable at Previous Drive End}) \tag{4}$$

Even when the previous injection has been finished, the current injection is established in accordance with the calculation of Expression (4).

In Step S209, the corrected target drive period is set as the minimum drive period.

With reference to Step S210, a description is now given of the drive information holding unit 27.

In Step S210, the drive end time point is calculated by adding the injection interval and the corrected target drive period to the previous drive end time point, and is held. Moreover, the corrected target drive period is also held. Then, the processing is finished.

According to the first embodiment, the current injection amount of the injector 1 can be corrected to the target injection amount in accordance with the injection interval, which is the period from the previous drive end to the current drive start, the drive period of the previous injection, and the fuel pressure.

Figure 8A:
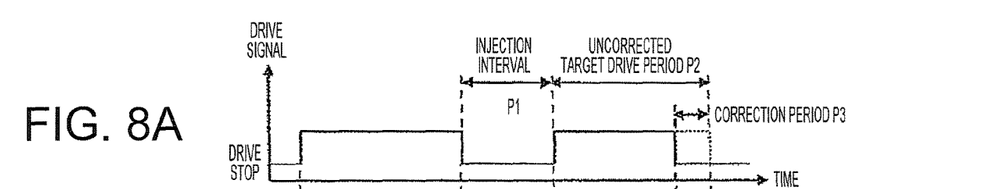
FIG. 8A is a timing chart for showing a state of a drive signal.
Figure 8B:
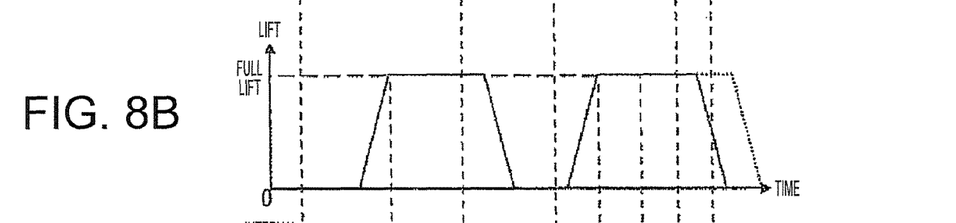
FIG. 8B is a timing chart for showing a lift amount.
Figure 8C:
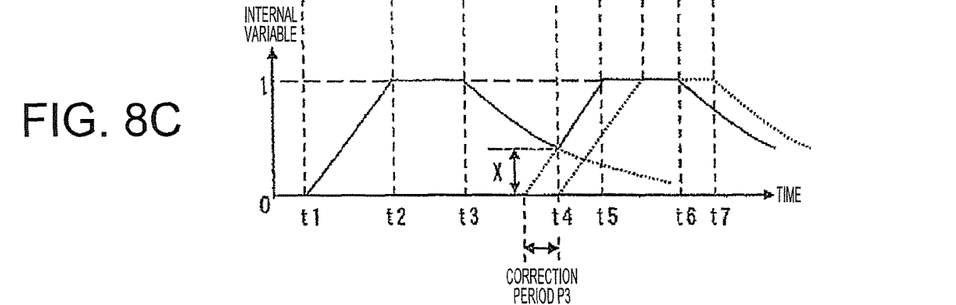
FIG. 8C is a timing chart for showing an internal variable.

FIG. 8A to FIG. 8C are timing charts of the first embodiment, and are illustrations of a case in which the target injection amounts of a first injection and a second injection are the same. It is assumed that an injection does not exist before the first injection at an effective injection interval. Moreover, as described above, it is assumed that start time points (t1 and t4) of the respective injections are determined in advance.

As shown in FIG. 8A, the drive signal is output at the time point t1 to start the first injection. On this occasion, it is assumed that the valve needle 3 seats on the valve seat 2, and, as shown in FIG. 8B, the lift on this occasion is 0. The valve needle 3 separates from the valve seat 2 after a short delay from the start of the drive, then moves to a stopper (not shown), and stops at the stopper. This state is shown as full lift. The timing at which the valve needle 3 reaches the full lift is easily detected by the acceleration sensor (not shown) mounted to the injector 1, and the time point t2 can thus be observed.

Thus, the time difference t2−t1 can be measured, and the reciprocal of the time difference is set as the gradient G. As a result, as shown in FIG. 8C, the internal variable changes on a line that takes the value of 0 at t1 and the value of 1 at t2.

The drive signal is stopped at a time point t3, and the current supply is finished. The valve needle 3 starts moving from the full lift after a short delay from this time point, and seats on the valve seat 2. Thus, the lift becomes 0. This concludes the description of the first injection.

The first drive period is t3−t1, and the first and second target injection amounts are the same as described above. Thus, and the uncorrected second target drive period P2 (t7−t4) is the same as the first drive period, and is equal to t3−t1.

The drive signal is output at the time point t4 to start the second injection. On this occasion, the injection interval P1 is t4−t3. The internal variable, which is 1 at the time point t3, attenuates at the square of the first-order delay. A curve of this attenuation is represented as the dotted line after the time point t4 for the sake of understanding. When the value of the internal variable at the time point t4 is denoted as "X", Expression (5) is obtained from Expression (2).

$$X = (\text{EXP}(-1 \times (t4-t3)/K))^{\wedge}2 \tag{5}$$

When the drive signal is output at the time point t4, the valve needle 3 starts separating from the valve seat 2 after a short delay as in the first time. However, as shown in FIG. 4A, the injection interval is shorter than the first injection interval, and thus the delay period becomes shorter and a period (t5−t4) from the drive start to a time point at which the full lift is reached becomes shorter than the first period (t2−t1). Thus, the second drive period needs to be decreased accordingly.

A correction period P3 (refer to FIG. 8A) for decreasing the second drive period is obtained in accordance with Expression (6) from Expression (3).

$$\text{Correction Period } P3 = X/G \tag{6}$$

Then, the second injection is carried out in a period (P2–P3) obtained by subtracting the correction period P3 from the uncorrected target drive period P2 (refer to FIG. 8A). In other words, a time point t6 satisfying Expression (7) is calculated by subtracting the correction period P3 from t7.

$$\text{Corrected Drive Period}(t6-t4)=(t7-t4)-\text{Correction Period } P3 \quad (7)$$

Figure 9A:
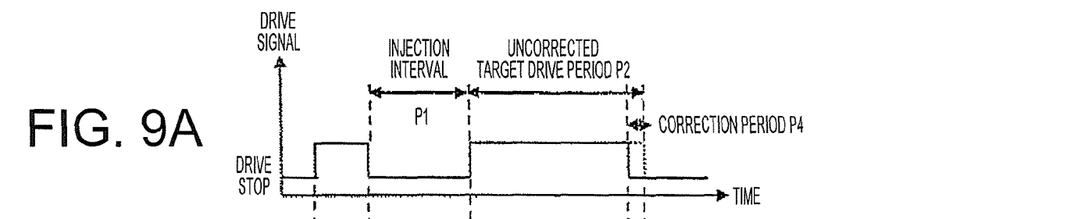
FIG. 9A is a timing chart for showing the state of the drive signal, FIG.
Figure 9B:
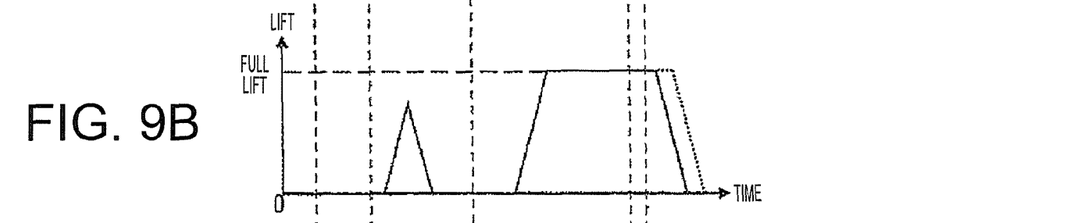
Figure 9C:
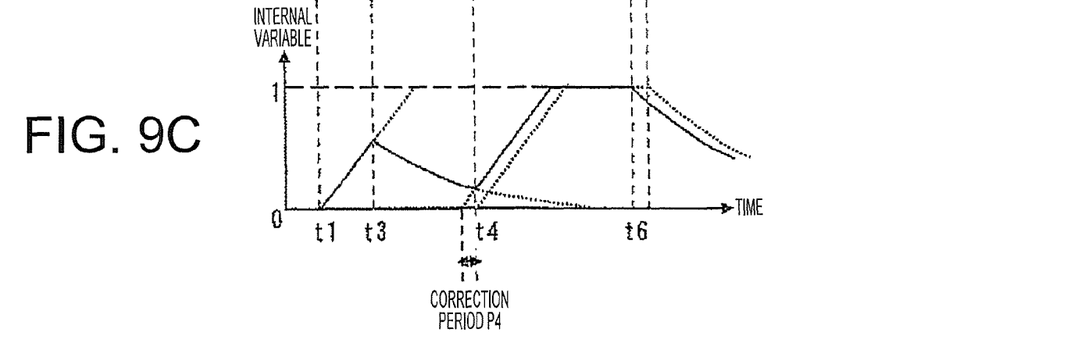

In the example of FIG. 8A to FIG. 8C, the case in which the valve needle 3 reaches the full lift in the first injection is shown, and an example in which the drive period for the first injection is shorter than those of FIG. 8A to FIG. 8C and the valve needle 3 does not thus reach the full lift is shown in FIG. 9A to FIG. 9C. The injection interval P1 and the uncorrected target drive period P2 are the same as those of FIG. 8A to FIG. 8C.

The drive signal is output at the time point t1 to start the first injection. The drive signal is stopped at the time point t3 (refer to FIG. 9A) before the valve needle 3 separates from the valve seat 2, and the current supply is finished. The attraction force applied to the valve needle 3 disappears, but the movement continues. Thus, the valve needle 3 separates from the valve seat 2 after the time point t3, slightly lifts, and then seats again on the valve seat 2 (refer to FIG. 9B).

As in FIG. 8A to FIG. 8C, the internal variable X increases at the gradient G from the time point t1 (refer to FIG. 9C), but the time reaches the time point t3 before the variable X reaches 1, and the internal variable attenuates at the square of the first-order delay from the time point t3 in the injection interval P1.

The drive signal is output at the time point t4 to start the second injection. A correction period P4 is a period obtained by dividing the value of the internal variable X by the gradient G, and the drive signal is output until the time point t6, which is obtained by subtracting the correction period P4 from the second uncorrected target drive period P2. The drive signal is stopped at the time point t6.

The second uncorrected target drive period P2 is the same in FIG. 8A to FIG. 8C and FIG. 9A to FIG. 9C, but the correction period P4 of FIG. 9 is different from the correction period P3 of FIG. 8A to FIG. 8C. This corresponds to the case of FIG. 4B. In other words, the lift starts earlier in FIG. 8A to FIG. 8C (corresponding to the solid line of FIG. 4B) having the longer first drive period than in FIG. 9A to FIG. 9C (corresponding to the dotted line of FIG. 4B) having the shorter first drive period, and the correction period increases accordingly (P3>P4). As a result, such control can be achieved that the second drive period for achieving the same injection amount is shorter in FIG. 8A to FIG. 8C than in FIG. 9A to FIG. 9C.

For a case of a three-split injection, the correction can be made by carrying out the calculation for the second injection similarly for the third injection.

Both in FIG. 8A to FIG. 8C and FIG. 9A to FIG. 9C, the second drive period is adjusted by advancing the drive end, but the correction of delaying the drive start may be made. However, the injection interval simultaneously changes, and the calculation becomes complex as described below.

It is necessary to solve Expression (8) in terms of the second drive start time point t4 when a value A of the internal variable at the time point t3, the second drive end time point t6, the gradient G, the first-order delay coefficient K, and the uncorrected drive period t7–t4 corresponding to the second injection amount (example of FIG. 8A to FIG. 8C) are given, and t4 is set as a variable.

$$G/A\times((t4-t3)+(t7-t4)-(t6-t3))=(\text{EXP}(-(t4-t3)/K))^{\wedge}2 \quad (8)$$

Therefore, the simple calculation can be carried out by correcting the drive end time point as in FIG. 5 without presenting a flowchart and a timing chart for illustrating Expression (8) used to correct the drive start time point.

Second Embodiment

A second embodiment of the present invention is different from the first embodiment in the calculation method for the drive period for the target injection amount and the processing carried out when the corrected drive period becomes less than the minimum drive period. The calculation method for the correction period itself is the same as that of the first embodiment.

Figure 10:
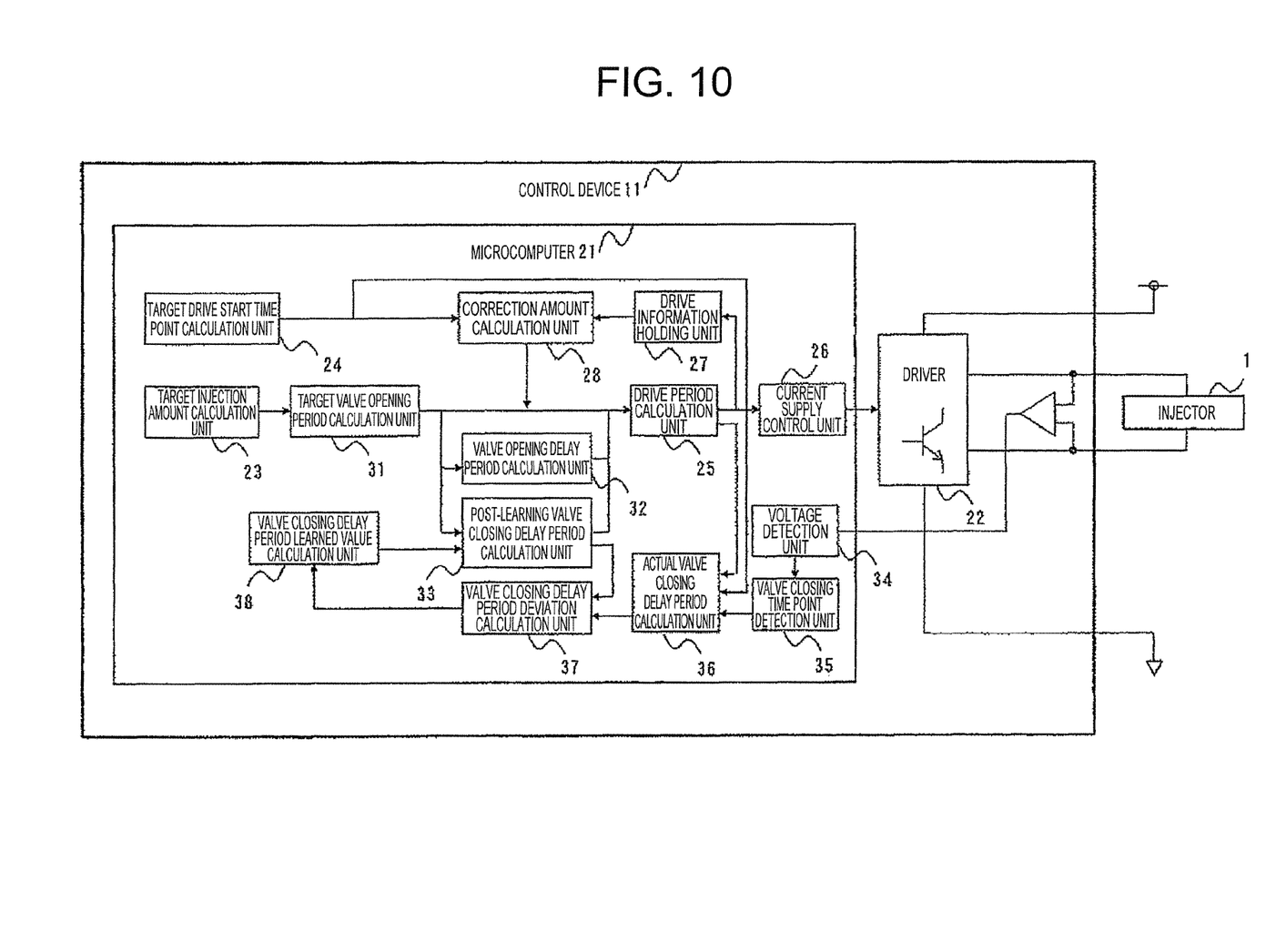
FIG. 10 is a block diagram for illustrating the control device for an injector according to a second embodiment of the present invention.

FIG. 10 is a diagram for illustrating the configuration of the control device 11 according to the second embodiment, in which the target injection amount calculation unit 23, the target drive start time point calculation unit 24, and the current supply control unit 26 have the configuration illustrated in FIG. 3, and operate similarly to the related art illustrated in the flowchart of FIG. 3.

A target valve opening period calculation unit 31 is configured to calculate a target valve opening period corresponding to the fuel injection amount calculated by the target injection amount calculation unit 23. A valve opening period means a period from the separation of the valve needle 3 from the valve seat 2 to the seating. A valve opening period characteristic of the injector 1 set in advance is used for the calculation of the valve opening period.

A valve opening delay period calculation unit 32 is configured to calculate a valve opening delay period of the valve needle 3 corresponding to the target valve opening period calculated by the target valve opening period calculation unit 31. The valve opening delay period is a period from the output of the drive signal to the separation of the valve needle 3 from the valve seat 2. A valve opening delay period characteristic of the injector 1 described later is used for the calculation of the valve opening delay period.

A post-learning valve closing delay period calculation unit 33 is configured to calculate a post-learning valve closing delay period corresponding to the target valve opening period calculated by the target valve opening period calculation unit 31 and the fuel pressure (not shown). The valve closing delay period is a period from the stop of the drive signal to the seating of the valve needle 3 on the valve seat 2. This valve closing delay period is calculated by searching a learned value map (Step S707 of FIG. 12) of a valve closing delay period learned value calculation unit 38 described later by the target valve opening period and the fuel pressure.

The drive period calculation unit 25 is configured to calculate the drive period from the target valve opening period, the valve opening delay period, the post-learning valve closing delay period, and the correction period described in the first embodiment in accordance with Expression (9).

Drive Period=Target Valve Opening Period+Valve Opening Delay Period−Post-Learning Valve Closing Delay Period−Correction Period(9)

Figure 11A:
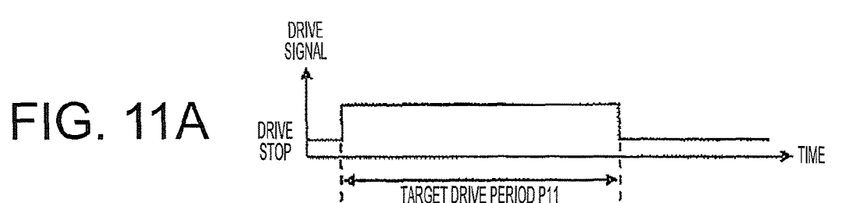
FIG. 11A is a timing chart for showing the state of the drive signal.
Figure 11B:
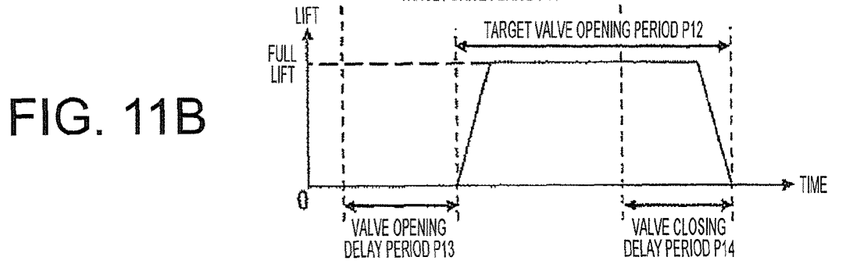
FIG. 11B is a timing chart for showing the lift amount.

FIG. 11A and FIG. 11B are each a timing chart for showing the drive signal and the lift operation of the valve needle 3. The operation of the valve needle 3 is delayed with respect to the change of drive/stop in the drive signal. A period from the start of the drive to the start of the lift of the valve needle 3 is set as a valve opening delay period P13, a period in which the valve needle 3 is actually opened is set as a valve opening period P12, and a period from the stop of the drive to the seating of the valve needle 3 on the valve seat 2 is set as a valve closing delay period P14.

The valve opening period P12 is first given as a target to the drive period calculation unit 25, and, in order to obtain a drive period P11 for achieving the target, in addition to the equivalence expressed by Expression (10), Drive Period=Target Valve Opening Period+Valve Opening Delay Period−Post-Learning Valve Closing Delay Period (10)

the correction period for correcting the influence of the preceding injection is subtracted as described in the first embodiment, and Expression (9) is consequently derived.

As in the first embodiment, the drive information holding unit 27 is configured to calculate a drive end time point, which is obtained by adding the drive period P11 to the target drive start time point, and temporarily hold the drive end time point until the next drive period P11 of the injector 1 is calculated together with the drive period P11.

The correction amount calculation unit 28 is configured to obtain an internal variable, for example, energy accumulated by the valve needle 3 of the injector 1 pressing the main spring 8 in accordance with a first-order expression of the previous drive period held in the drive information holding unit 27 as in the first embodiment.

Then, the difference between the drive end time point of the previous injection held in the drive information holding unit 27 and the current target drive start time point, namely, the injection interval is calculated. The energy and the like are attenuated at the square of the first-order delay during this injection interval, thereby obtaining the remainders of the energy and the like at the current drive start time point. The result is an offset of the energy and the like in the current injection, and a drive period corresponding to the offset is obtained through the gradient G. The result is set as the correction amount.

An electric potential difference between both terminals of the injector 1 driven by the driver 22 is generated by an operational amplifier and the like (not shown), and is input to the microcomputer 21. A voltage detection unit 34 is configured to apply A/D conversion to the input voltage, thereby converting the input voltage to a variable as an injector voltage so that the microcomputer 21 can use the variable for calculation.

The valve closing time point detection unit 35 is configured to calculate a valve closing time point, which is a time point at which the valve needle 3 seats on the valve seat 2, from the injector voltage. It is known that a change occurs to the injector voltage at the moment of the seating, and this characteristic can be detected through differentiation, thereby obtaining the seating time point.

An actual valve closing delay period calculation unit 36 is configured to calculate an actual valve closing delay period from the valve closing time point calculated by the closing time point detection unit 35, the target drive start time point calculated by the target drive start time point calculation unit 24, and the drive period calculated by the drive period calculation unit 25 in accordance with Expression (11).

Actual Valve Closing Delay Period=Valve Closing Time Point−(Target Drive Start Time Point+Drive Period) (11)

In other words, the actual valve closing delay period is obtained by subtracting the drive end time point from the valve closing time point. The actual valve closing delay period is an actual value of the valve closing delay period of FIG. 11A and FIG. 11B.

A valve closing delay period deviation calculation unit 37 is configured to calculate a deviation between the injector actual valve closing delay period calculated by the actual valve closing delay period calculation unit 36 and the post-learning valve closing delay period calculated by the post-learning valve closing delay period calculation unit 33. In other words, the valve closing delay period deviation calculation unit 37 is configured to calculate the deviation between the actual valve closing delay period and the post-learning valve closing delay period used before the injection.

The valve closing delay period learned value calculation unit 38 is configured to use the valve closing delay period deviation calculated by the valve closing delay period deviation calculation unit 37 to update the learned value map having the target valve opening period and the fuel pressure as the axes. Moreover, the updated learned value map is provided to the valve closing delay period calculation unit 33 after the leaning.

Figure 12:
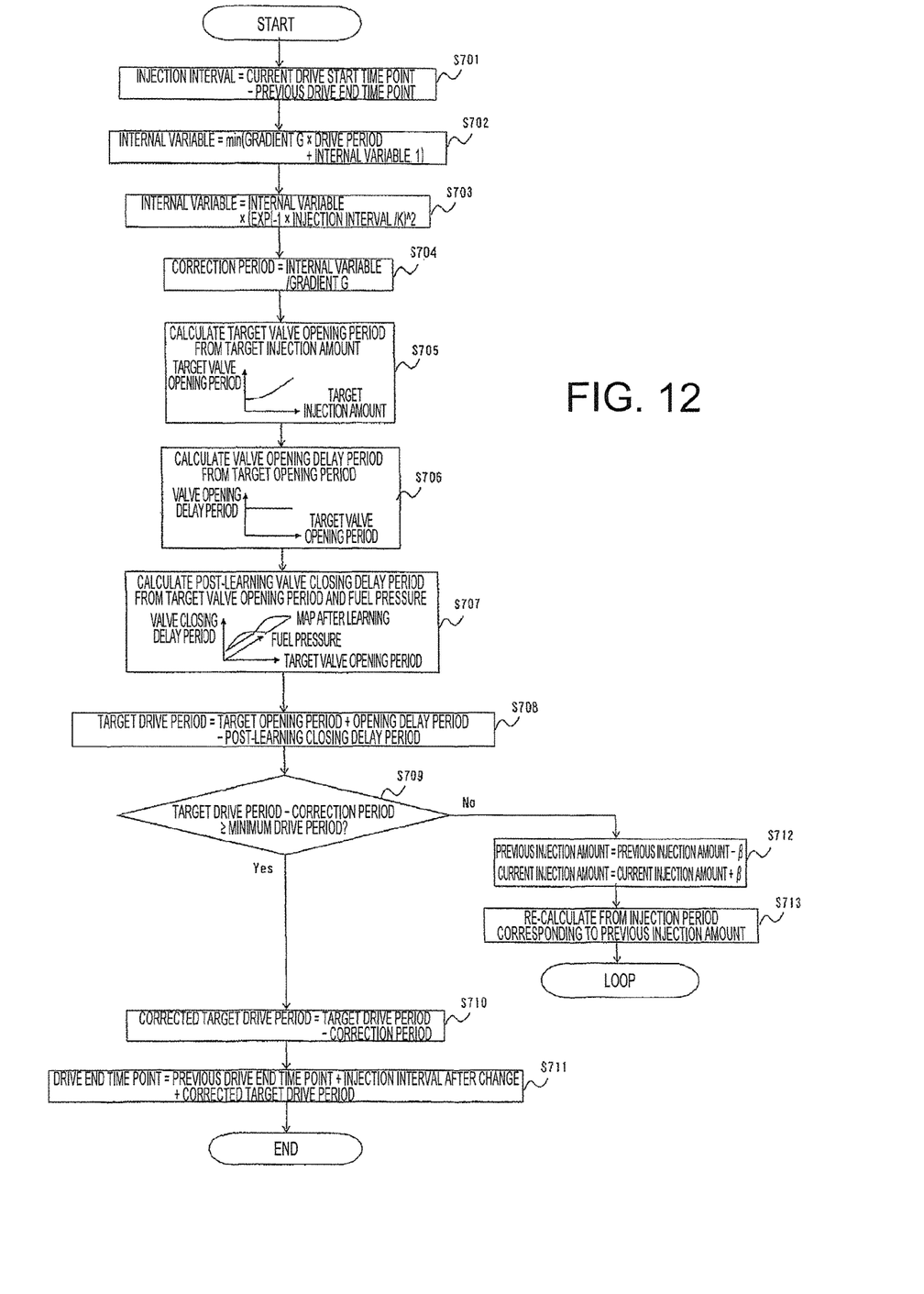
FIG. 12 is a flowchart for illustrating an operation sequence of the control device for an injector according to the second embodiment of the present invention.

FIG. 12 is a flowchart for illustrating an operation sequence of the second embodiment.

Step S701 to Step S704 are the same as those of the flowchart of the first embodiment illustrated in FIG. 5.

In Step S705, the target valve opening period is calculated from the target injection amount calculated by the target injection amount calculation unit 23 in accordance with a shown characteristic of the injector 1 set in advance.

In Step S706, a valve opening delay period is calculated from the calculated target valve opening period in accordance with a shown characteristic of the injector 1 set in advance.

In Step S707, a post-learning valve closing delay period is calculated from the target valve opening period and the fuel pressure in accordance with an illustrated map after the learning.

In Step S708, an uncorrected target drive period is calculated in accordance with Expression (10).

In Step S709, the correction period is subtracted from the target drive period, and whether or not a result is equal to or more than the minimum drive period is checked. When the result is equal to or more than the minimum drive period, the processing proceeds to Step S710. When the result is less than the minimum drive period, the processing proceeds to Step S712. The minimum drive period is the same as that described referring to FIG. 5.

In Step S710, the correction period is subtracted from the target drive period as in the first embodiment.

In Step S711, as in the first embodiment, the drive end time point is calculated by adding the injection interval and the corrected target drive period to the previous drive end time point, and is held. Moreover, the corrected target drive period is also held. Then, the processing is finished.

Out of processing starting from Step S712, which is processing carried out when the result of subtraction of the correction period from the target drive period is less than the minimum drive period, a description is given of processing different from that of the first embodiment. In other words, the processing is an alternative method to Steps S208 and S209 of FIG. 5. Moreover, this flow can be applied to the case in which the previous injection has not been carried out yet. For example, this flow can be applied to a case in which, before the first injection of the split injection is carried out, the correction amounts are calculated at once for respective split injections.

In Step S712, the current injection amount is increased by a predetermined value β and the previous injection amount is decreased by a.

In Step S713, re-calculation is started from correction calculation for the previous injection amount. The adjustment is carried out by repeating this processing. The second injection can always be achieved in this way.

As described in the section of the minimum drive period of FIG. 5, also in this case, when the precision of the calculation model of the second embodiment is high, the minimum drive period is unlikely to become less than the ineffective drive period, and thus the operation may directly proceed from Step S708 to Step S710.

In this way, the current injection amount of the injector can be corrected to the target injection amount in accordance with the injection interval, which is the period from the previous drive end to the current drive start, and the drive period of the previous injection.

The second embodiment is the same as the first embodiment in the calculation of the correction period. Therefore, a description of timing charts is the same as the description given of the first embodiment referring to FIG. 8A to FIG. 8C and FIG. 9A to FIG. 9C, and is thus not given.

The control for the injector 1 of the present invention is not limited to the injector for the direct injection into the cylinder, and can be applied to an injector for injection into an intake pipe and a device equivalent to an injector for diesel fuel and an injector for injecting urea into an exhaust pipe.

As described above, in the present invention, the embodiments may appropriately be modified or omitted within the scope of the present invention.

What is claimed is:

1. A control device for an injector, comprising:
a driver configured to drive an injector provided in a fuel passage of an internal combustion engine; and
a microcomputer configured to calculate a drive signal to be supplied to the driver,
wherein the microcomputer is configured to:
calculate, when a period from a start of current supply to the injector to a stop of the current supply is set as a drive period, the drive period of a previous injection, an injection interval, which is a period from a stop of previous current supply to a start of present current supply, and an uncorrected target drive period for a current injection;
obtain a correction period by increasing a value from zero in proportion to the drive period of the previous injection during the drive period of the previous injection, attenuating the value at a first-order delay during the injection interval, dividing the value by a coefficient of the proportion at a start time point of the present current supply, and setting a result of the division as the correction period; and
set a period obtained by subtracting the correction period from the uncorrected target drive period as a current drive period.

2. A control device for an injector according to claim 1, wherein the microcomputer is configured to store a characteristic map in which the coefficient of the proportion and a time constant of the first-order delay depend on a fuel pressure.

3. A control device for an injector according to claim 1, wherein, when the microcomputer subtracts the correction period from the uncorrected target drive period, the microcomputer obtains the current drive period by advancing end of the present current supply by the correction period.

4. A control device for an injector according to claim 1, wherein the microcomputer is configured to increase the injection interval so that the current drive period obtained as a result of the subtraction of the correction period from the uncorrected target drive period is more than a minimum drive period during which the injector is capable of carrying out an injection.

5. A control device for an injector according to claim 1, wherein, when the current drive period obtained as a result of the subtraction of the correction period from the uncorrected target drive period is less than a minimum drive period during which the injector is capable of carrying out an injection, the microcomputer decreases a drive period of an injection immediately before the current injection and increases the uncorrected target drive period of the current injection while maintaining a sum of injection amounts so that the current drive period is more than the minimum drive period during which the injector is capable of carrying out the injection.

6. A control device for an injector according to claim 1, wherein the microcomputer is configured to:
calculate a target injection amount;
calculate a target valve opening period corresponding to the target injection amount;
calculate a valve opening delay period of a valve needle of the injector corresponding to the target valve opening period;
calculate a post-learning valve closing delay period corresponding to the calculated target valve opening period and a fuel pressure;
calculate a target drive period from the target valve opening period, the valve opening delay period, and the post-learning valve closing delay period; and
calculate a corrected target drive period by subtracting the correction period from the target drive period.

* * * * *